United States Patent [19]

Wesolowski

[11] Patent Number: 4,805,194
[45] Date of Patent: Feb. 14, 1989

[54] SERIAL DATA COMMUNICATION SYSTEM

[75] Inventor: Jan S. Wesolowski, Redwood City, Calif.

[73] Assignee: Ampex Corporation, Redwood City, Calif.

[21] Appl. No.: 788,605

[22] Filed: Oct. 17, 1985

[51] Int. Cl.[4] .............................................. H03K 9/00
[52] U.S. Cl. ..................................... 375/75; 375/121; 370/91
[58] Field of Search ................ 375/75, 116, 117, 121; 364/900, 200; 370/82, 91, 102, 48

[56] References Cited

U.S. PATENT DOCUMENTS

| | | | |
|---|---|---|---|
| 4,030,072 | 6/1977 | Bjornsson | 364/200 |
| 4,048,440 | 9/1977 | Peck et al. | 375/117 |
| 4,056,779 | 11/1977 | Toler | 455/17 |
| 4,093,981 | 6/1978 | McAllister et al. | 364/200 |
| 4,106,091 | 8/1978 | Hepworth et al. | 364/200 |
| 4,375,103 | 2/1983 | Arneth et al. | 375/121 |
| 4,488,294 | 12/1984 | Christensen et al. | 375/118 |
| 4,538,272 | 8/1985 | Edwards et al. | 179/18 EE |
| 4,558,409 | 12/1985 | Gross et al. | 375/106 |
| 4,633,489 | 12/1986 | Morishita | 375/121 |

OTHER PUBLICATIONS

Penney et al., "Survey of Computer Communication Loop Network Part 1" Computer Communications, vol. 2, No. 4, Aug. 1979, pp. 166–177.

SMPTE Recommended Practice, RP 113, "Supervisory Protocol for Digital Control Interface".
Proposed American National Standard, ANSI PH22.207M, "Electrical and Mechanical Characteristics for Digital Control Interface".

Primary Examiner—Robert L. Griffin
Assistant Examiner—Stephen Chin
Attorney, Agent, or Firm—William A. Marvin; James A. LaBarre; Richard P. Lange

[57] ABSTRACT

A serial data communication system including a microprocessor and an asynchronous communication interface adapter (ACIA) implementing a SMPTE Supervisory Protocol for Digital Interface Control. The system detects the beginning of a break character as the first framing error which occurs after the last word of a data block has been detected. The receive clock of the ACIA is disabled in response to the start of break detection by the software reset of a bistable device which disables a receive clock gate. The framing error detection circuit of the ACIA is additionally disabled by the termination of the receive clock signal. The end of the break character is detected as the space to mark transition before the start of the first word in the data block. The receive clock is enabled by setting the bistable device with the end of break transition thereby detecting the termination of the break character and enabling the receive clock gate. This operation correctly restarts the frame timing circuit of the ACIA at the start bit of the first word of a data block.

33 Claims, 3 Drawing Sheets

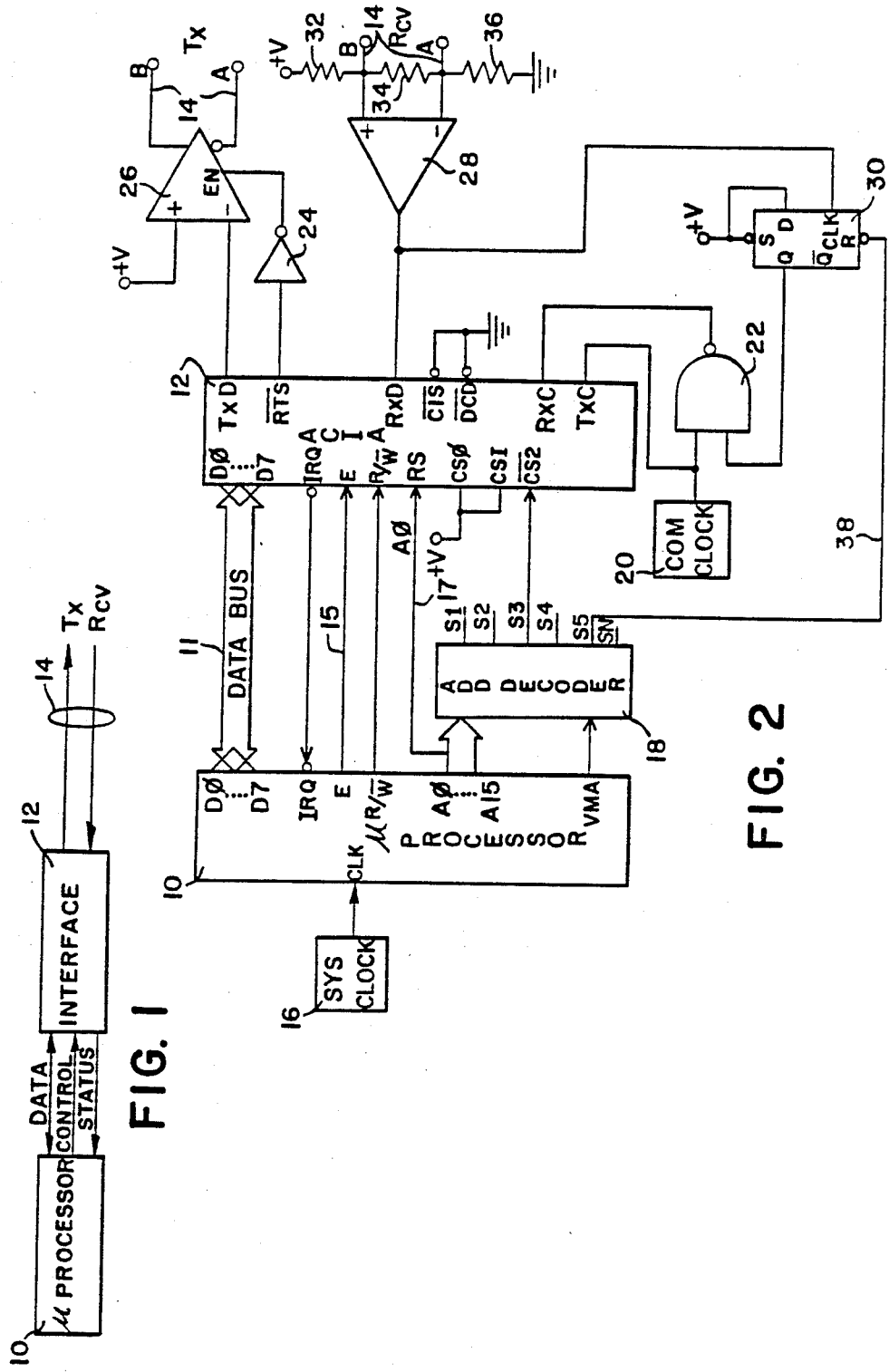

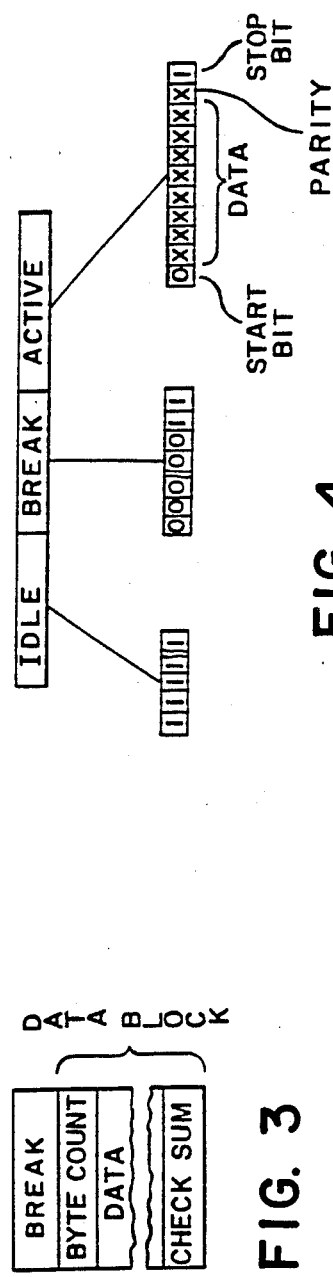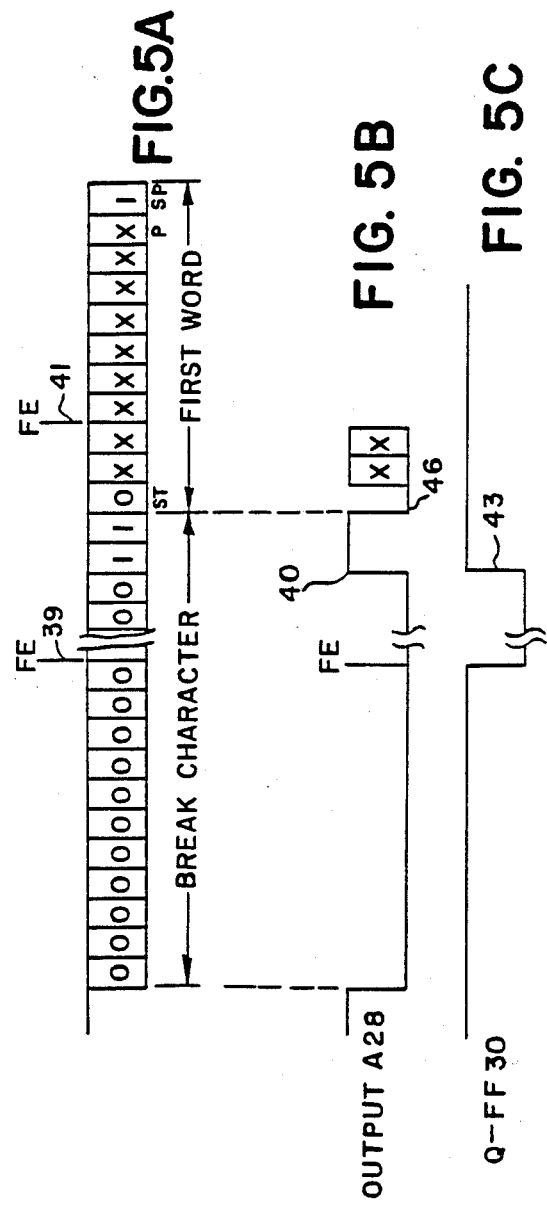

SERIAL DATA COMMUNICATION SYSTEM

The invention pertains generally to serial data communication systems and is more particularly directed to an asynchronous communication system for receiving and transmitting serial data according to a standard protocol having unique control characters such as a break.

As modern TV equipment for broadcasting and recording becomes more complex, a system philosophy has been used to implement many more apparatus. This includes providing a plurality of different devices, each performing a separate operation, which must communicate with one another to be integrated into a single system. Naturally with the advent of digitizing most circuitry, the most common communication systems now use digital data for information transfer and control. In particular, a number of devices for simplicity use serial data transmissions in an asynchronous format for the transfer of data and control information between devices.

With numerous devices communicating asynchronously in a serial data format, there is the necessity to form communication protocols which are standardized and can be used by more than one type of device. The natural evolution of system philosophy has led to hierarchial protocols, such as supervisory protocols. A supervisory protocol is a defined procedure for a communication channel for the purpose of transmitting control and data messages to one device from other equipment. The supervisory protocol defines the precedence and order of priority for communication that the devices forming the system have relative to one another; the format, modes, and types of communication permitted under the protocol; and special control characters used in implementing the protocol.

It is generally intended that the supervisory protocol be part of the overall system philosophy and allow interconnection of programmable and nonprogrammable equipment as required to configure an operational system with a defined function. This type of protocol also allows rapid reconfiguration of a system to provide more than one defined function utilizing a given group of devices or equipment which need not be the same. One particularly advantageous type of serial data communication protocol is more fully described in Society of Motion Picture and Television Engineers (SMPTE) recommended practice RP113 "Supervisory Protocol for Digital Control Interface" as published in the SMPTE Journal May 1982. These higher level protocols assume digital control interfaces which are defined as to function by other standards. For example, the referenced SMPTE protocol assumes a digital interface which operates according to the Proposed American National Standard "Electrical and Mechanical Characteristics for Digital Control Interface" (ANSI PH22.207M).

Programmable microprocessors may be used to implement communication controllers in television equipment. Their programable flexibility can be used to great advantage in providing a communication protocol which is adaptable for different purposes and compatible with many kinds of equipment. Generally, small microprocessors belong to a family of compatible integrated circuit devices or chips which include serial data communication interface devices. These chip families have a standardized communication protocol which is generally serial and asynchronous but incompatible with the higher level and more complicated television protocols. The interface chips are usually incompatible with supervisory protocols because they do not generate or detect the specially defined control characters needed for the communication. Particularly in the referenced SMPTE protocol, break character detection for receiving and break character generation for transmitting is not provided for in many standardized asynchronous communication chips. The break character which the referenced protocol defines as from 17-20 space bits followed by at least two mark bits prefaces every data communication.

Further, many of the digital communication interface chips used with small microprocessors have means for detecting a serial data error based on timing and special control bits, such as start and stop bits. If these bits do not occur in a predetermined interval, the communication interface will generate a data timing error signal sometimes called a "framing error" signal to indicate that the serial data between the two control bits is in error. When a higher level supervisory protocol is used with these chips the special characters of the protocols may cause the framing error circuitry of the communication interface chip to indicate that a word having an error in it is good data or that perfectly good data has an error in it. This is caused by the timing of the special characters of a supervisory protocol which are usually of a different number of bits than normal data words and which are not easily detected by standard communication interface chips.

Specialized communication interface chips which are compatible with supervisory protocols are available but are much more expensive than the standardized interface chips. Further, the specialized interface chips are incompatible with certain families of small microprocessors which have particular advantages for use in TV equipment such as cost and size. Therefore, it would be advantageous to provide a serial data communication system using a microprocessor and standard communication interface chip which is compatible with a high level supervisory data protocol.

SUMMARY OF THE INVENTION

The invention provides a serial data communication system including a microprocessor and communication interface device which can detect and generate the special characters of a high level supervisory protocol for digital control and data transfer.

In a preferred implementation the system includes a means for detecting the start of a break character and a means for detecting the termination of the break character of the referenced SMPTE supervisory protocol. The start of break detection means fully identifies the receipt of the break character without ambiguity. The system further includes means for transferring the communication device from an idle to an active mode in accordance with the supervisory protocol. The end of break detection means operates in such a manner that the communication device does not output an incorrect framing error and is retimed to the start of the active data with the first start bit of data. In this manner the special break character is detected and the system transferred to an active state without interfering with the normal framing error detection of the device.

Specifically, the start of the break character is detected as the initial framing error which follows the end of the last data transfer. This excludes the possibility that the framing error is due to data transfer because no data is to be received when the system is in the idle state and the communication device is waiting for a break character. In response to the start of break detection, the receive clock of the interface device is inhibited until the end of the break character is detected thereby retiming the framing error detection circuitry to the start bit of the first actual word of the data. When the end of the break character is detected the receive clock is enabled and serial data and framing errors detected normally.

These and other features and aspects of the invention will be readily apparent from and more fully described by the following detailed description, particularly when taken in conjunction with the appended drawings wherein:

BRIEF DESCRIPTION OF THE DRAWINGS

FIG. 1 is a system block diagram of a serial data communication system including a microprocessor and communication interface device communicating over a serial data channel and constructed in accordance with the invention;

FIG. 2 is a detailed electrical schematic diagram of the serial data communication system illustrated in FIG. 1;

FIG. 3 is a pictorial representation of a data block of the SMPTE communication protocol used by the system illustrated in FIG. 2;

FIG. 4 is a pictorial representation of the separate operational states and bit formats of the serial data communication system illustrated in FIG. 2;

FIGS. 5A-5C are waveform diagrams of various signals for the serial data communication system illustrated in FIG. 2;

DETAILED DESCRIPTION OF THE PREFERRED EMBODIMENT

Figure 6:
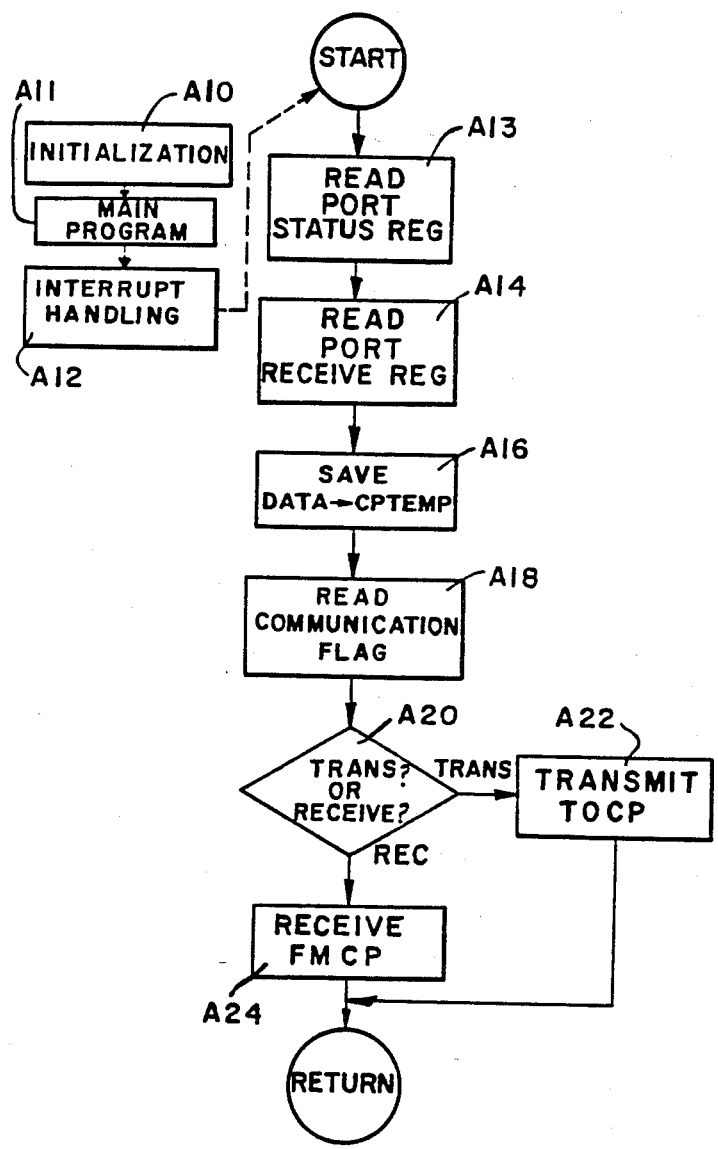
FIG. 6 is a detailed system flowchart of the program controlling one channel of communication for the microprocessor of the system illustrated in FIG. 2.

FIG. 1 shows a generalized serial data communication system constructed in accordance with the invention. A microprocessor 10 communicates through a digital communication interface device 12 with a serial data transmission channel 14 having a transmit line Tx and a receive line Rcv. Serial data in bit form is transmitted from transmit line Tx, and serial data in bit form is received at the receive line Rcv. The communication interface device 12 assembles the serial incoming bits into words of a predetermined bit length and transfers them to the microprocessor 10 under control of that device. Outgoing data is supplied from the microprocessor 10 to the interface device 12 in parallel bit form or words which are then serialized by the device and output on the transmit line Tx.

The interface 12 responds to control commands from the microprocessor 10 for sending and receiving data and may further provide status information to the microprocessor to assist in the communication operation.

The interface 12 is necessary for serial data communication because the microprocessor 10 is operated at a much higher speed or baud rate than the serial data communication and dedication to only communication functions would slow it down. Further, data transfer for the microprocessor 10 is inherently parallel, and the serial data interface provides for the assembly of received bits into multibit words and the disassembly of multibit words into serial transmissions. Normally the microprocessor 10 can control a plurality of communication channels and interface circuits 12. Integrated into a system, the purpose of the microprocessor 10 would be to communicate with and perform a system function for some higher level device in the control hierarchy or to act as the supervisory control. For clarity in describing the present invention only one serial data channel of a system has been shown, although it will be evident that the teachings of the invention can be readily expanded to a systems environment.

FIG. 2 shows a detailed schematic of the preferred implementation of the system illustrated in FIG. 1 where microprocessor 10 communicates over an 8-bit bidirectional data bus 11 to an interface device 12 comprising an asynchronous communication interface adapter (ACIA). The microprocessor 10 and ACIA 12 are preferably standardized chips from the same integrated circuit family and in the illustration are a MC6800 and a MC6850, respectively manufactured by the Motorola Corporation of Schaumburg, Ill. The operation of these chips is more fully described in the Motorola 6800 family technical specifications published by the same corporation. The terminal designations on the chips 10 and 12 are from those specifications and will be used throughout the disclosure to indicate signal connections to the chips. The operations of the chips 10, 12 from the signals applied to the designated terminals, as will be understood by those skilled in the art are those described in the technical specifications. Inverted signals are preceded by an * symbol to show negative true logic levels.

The microprocessor 10 is driven by a system clock 16 transmitting a high frequency clock waveform to the CLK input of the device. This clock is internally divided down to provide an external clock signal E of 1 MHz. output from the microprocessor on line 15 for timing and memory transfer purposes. The system clock controls main memory cycle timing and thus, the clock E, being synchronous with or to a phase of that clock, can be used for data transfer to or from peripheral devices other than main memory. External memory for the microprocessor 10 including RAMS and ROMS have not been shown for the purpose of clarity.

The microprocessor 10 further includes data outputs D0-D7 for transmitting or receiving an 8-bit digital word over the data bus 11. A read/write control output R/*W is used to determine the direction of the data on the data bus 11 with a high logic level directing data to the microprocessor 10 and a low logic level directing data from the microprocessor. Address outputs A0-A15 allow a memory mapping of controlled peripheral devices and a selection of the particular memory space read from or written into. The address outputs A0-A15 are decoded by an address decoder 18 which generates select signals S1,S2 . . . SN from combinations of the address bits. The address decoder 18 is enabled by the signal output from the terminal of the microprocessor 10 labeled VMA. This is the signal the microprocessor generates to address virtual memory in its memory space. The microprocessor 10 is adapted to handle interrupt signals at its *IRQ input by transferring program control to an interrupt vector address.

The ACIA 12 includes bidirectional data terminals D0-D7 connected to the data bus 11. Data and control information are passed from the microprocessor 10 to the ACIA 12 via these terminals and data and status information are passed from the ACIA to the microprocessor through these terminals. The ACIA 12 is run synchronously with the external clock of the microprocessor 10 by having its clock input E connected by the clock line 15 to the output terminal E of the microprocessor. The read/write control input R/*W of the ACIA 12 is connected to the read/write control output R/*W of the microprocessor 10 and determines the direction of the data transfer from the ACIA.

For the ACIA 12, the determination of whether digital information is data or control information, in the case of a write operation, or data or status information, in the case of a read operation, is supplied by the logic level signal AO output from the microprocessor address line AO and the connected to the register select input RS of the device. Information transferred from or to the ACIA 12 is data if the signal line 17 is at a high logic level and is control or status information if the line is a low logic level. The ACIA 12 is enabled for operation by a low logical level signal from select line S3 to its *CS2 input.

The ACIA 12 furthur includes a serial data output TxD which is connected to the inverting input of a biphasic line driver 26. The noninverting input of line driver 26 is connected to the positive logic voltage +V. A signal from ready to send output *RTS is buffered and inverted in an inverter 24 before being applied to the enabling input EN of the line driver 26. Serial data output from the TxD output is transmitted on the transmit line Tx as a biphasic signal (± logic levels) between conductors B and A to a receiving device attached to the communication channel 14. Once the ACIA is commanded to transmit it will, in synchronization with a transmit clock applied to its TxC input, send serial data bits to the line driver 26 until an internal transmit register is empty.

For receiving serial data information in an asynchronous manner, the ACIA 12 is connected to the output of a line receiver 28 via its receive input RxD. Biphasic conductors B and A of the receive line Rcv are connected to the serial data channel 14 and receive data from a transmitting device connected thereto. The line receiver 28 receives biphasic serial data via a network of resistors 32, 34, and 36 connected between a source of positive logic voltage +V and ground. The noninverting input of the line receiver 28 is connected to one terminal of the center resistor 34 of the network and the inverting input of the line receiver is connected to the other terminal of resistor 34. The line receiver 28 buffers and converts the biphasic digital information of the receive channel Rcv into a single logic level signal to be input to the receive input RxD of the ACIA device 12.

Transmission and reception of serial digital bits is timed by a transmit clock and a receive clock respectively which are usually produced at some multiple of the baud rate. In this particular implementation a communication clock oscillator 20 produces a high frequency clock signal at 0.6144 MHz (16 times 38.40 KHz) to the transmit clock input TxC of the ACIA device and the same clock signal is applied to the receive clock input RxC of the device through NAND gate 22.

The receive clock applied to the RxC terminal from the communication clock oscillator 20 is enabled and disabled by the logic level of the Q output of a D-type bistable device 30. The bistable device 30 has its direct set input *S and similarly, its D-input connected to a positive logic voltage +V. The bistable 30 has its clock input CLK connected to the output of the line receiver 28. The bistable 30 can be reset by a select signal on line 38 generated by the address decoder 18 applied to the direct reset input *R of the bistable.

In operation, the ACIA 12 receives data bytes from the microprocessor 10 over the data bus 11 and stores them in the internal transmit register until microprocessor 10 gives a command to transmit. The ACIA 12 thereafter, simultaneously serializes the bytes stored in the transmit register. The ACIA 12 while transmission is taking place will add a start bit, parity bit, and stop bit to each serial word. The serial data bits are transmitted at the timed intervals of the transmit clock until the transmit register is empty. The condition indicating that the transmit data buffer is empty is signaled to the microprocessor 10 by an interrupt to its IRQ input from ACIA 12.

To switch from a transmit to a receive mode, the ACIA 12 should be loaded with the proper control byte. At this point the read mode is activated to transfer data from a receive register in the ACIA 12 via the data bus 11 to the microprocessor 10. The receive register is filled asynchronously from line receiver 28 which provides data to the RxD input of the device 12. When the receive register is full, it signals the condition by interrupting the microprocessor 10 with an *IRQ signal. The receipt of serialized data from the line receiver 28 is timed by the receive clock at the RxC input to divide the serial data into separate bit intervals for concatenating them into 8-bit words The ACIA 12 strips start, parity, and stop bits from the serialized data before transmitting them in an 8-bit word form to the microprocessor 10.

The ACIA 12 contains error detection circuitry for determining framing and parity errors in the received serial data bytes. The error detection circuitry is used to protect the communication system from data format errors and timing errors where the baud rate of the transmitting device changes or the serial transmission is interrupted. The circuitry includes a framing error counter which times the interval from a start bit (space) to a stop bit (mark). If a stop bit (mark) does not occur before the counter times out by counting the interval then a framing error signal is generated by the ACIA 12. The framing error signal for each byte can be read by the microprocessor 10 by requesting a status byte from a status register of the ACIA 12 when the data is read. The status register also indicates whether a parity error exists for the last received word and the status of the transmit and receive registers. The occurrence of a start bit (space) after a framing error will restart the sampling of the ACIA 12 and framing error counter to start timing the frame of the next new data word.

FIGS. 3 and 4 will now be used to describe a portion of the generalized supervisory protocol set forth in SMPTE recommended practice RP113. The microprocessor 10 or tributary, as it is called in the protocol, can have any one of five major operational states. In the first state, or idle state, the microprocessor 10, does not perform any communications and will be performing other system operations. The idle state for the particular communication channel will be exited only in response to a special control or break character of the protocol. The next state is the active state and is the prerequisite for a transition to any of the other operational states. The microprocessor 10 enters this state whenever the break character is received and detected. The other three active states are poll, select, and group select which can be handled by special programming in the microprocessor but the descriptions of which are not necessary for an understanding of the present invention.

For the communication system illustrated in FIG. 2, the active operational state of the device consists of communications having the format illustrated in FIG. 3. For receiving data, a break character is detected and then a data block is received from a communicating device via the communication channel. Conversely, for transmission the break character is generated and then the data block is transmitted via the communication channel. Every data block must be preceded by a break character and thus, each communication device of the system must be able to generate that special character and receive or detect that character. Each data block consists of a plurality of 8-bit words including a byte count word, followed by the number of 8-bit data words in that byte count. The data block is terminated with an 8-bit check sum word which is the complement of the summation of all the data block words including the byte count.

The operational states of the communication system are illustrated in FIG. 4 and represented therein by serialized bits. It is to be understood that the ones and zeros shown are merely representative of marks and spaces which can be interchanged readily with the opposite levels. For this particular protocol, however, an idle state is represented by the transmission of all ones in the serial bit positions. The break character or special start character for the data block is comprised of 17-20 bits of space ending in a minimum of two bits of mark or ones and is utilized to synchronize all devices connected to the interface. Thereafter, the data block starts consisting of a plurality of standard serial data words. In this protocol the standard serial data word includes a start bit (space), 8 data bits (mark or space), a parity bit (even), and one stop bit (mark).

FIG. 5A illustrates the timing of the receipt of the break character and data block relative to the framing error signal generation of the ACIA device 12 without the invention. In FIG. 5A the break character is illustrated as between 17-20 space bits ended by at least 2 mark bits. The idle condition of the channel will not cause a framing error signal to be generated because this all mark condition will not reset the sampling and error counter. When the ACIA 12 receives the break character the first space bit will reset the framing error circuitry. A framing error signal will be generated at the eleventh bit because the ACIA expects to see a stop bit (mark) at that time in the data word. After generating this framing error signal, however, the device assumes that the logical zero level still existing at its input indicates the beginning of the next word. At the end of the next word interval (11 bits) the ACIA again looks for the stop bit, but if the break character has already ended, then that time period may occur immediately after the break or during one of the bits of the first word. Whether or not a framing error will be generated is determined by the bit value where the determination may be made. Because this determination is made in the middle of the first word, it may or may not generate a framing error and further cause a second error. The interface device does not detect the end of the break character and secondly, the first word is not timed correctly and a framing error indication may be generated at its termination in error.

The invention solves these problems by detecting the start of the break character and its termination, and by retiming the framing error circuitry to the first real data word. The start of the break character is detected as the first framing error of a new data transmission. This is accomplished in the microprocessor 10 by reading the status of the ACIA 12 to determine if a received byte has a framing error. If a framing error occurs after the last word of a data block is received, it is taken as the beginning of a break character. The break detection means is normally disabled until then so that the framing error circuitry will detect normal data errors. At the time of the start of a break, the microprocessor 10 through the address decoder 18 and select line 38 resets the bistable device 30. The waveforms for this operation are shown in FIG. 5B for the output of the line receiver 28 which is inputting the serial data to the ACIA 12, and in FIG. 5C for the Q output of the bistable device 30.

The reset of the bistable device 30 causes the receive clock to be disabled from the receive input RxC of the ACIA 12. This causes the ACIA to stop accepting incoming bits and halts the framing error counter at its current count. The receive clock is disabled until the break character ends at edge 40 with the last two mark bits. The logical 0 to 1 transition of these mark bits clocks the bistable device 30 thereby transferring the positive logic level from its D-input to its Q-output. This positive logic leval on the Q-output of bistable device 30 at edge 43 enables the receive clock to again begin timing the incoming bits from line receiver 28. After detecting the framing error, the framing error counter is reset by a reset command sent by the microprocessor to the ACIA and because the acceptance of incoming bits is disabled until the break character ends, the framing error counter is correctly retimed to count with the first start bit at edge 46 of the first word in the data block as it should. Thereafter, the break detection means of the system is disabled and framing errors are timed normally by the ACIA 12. Because the break character has already been detected and the end of the data block (check sum) has not yet been detected, the framing errors generated during this time are known to be true data errors and recognized as such by the microprocessor 10.

Figure 7:
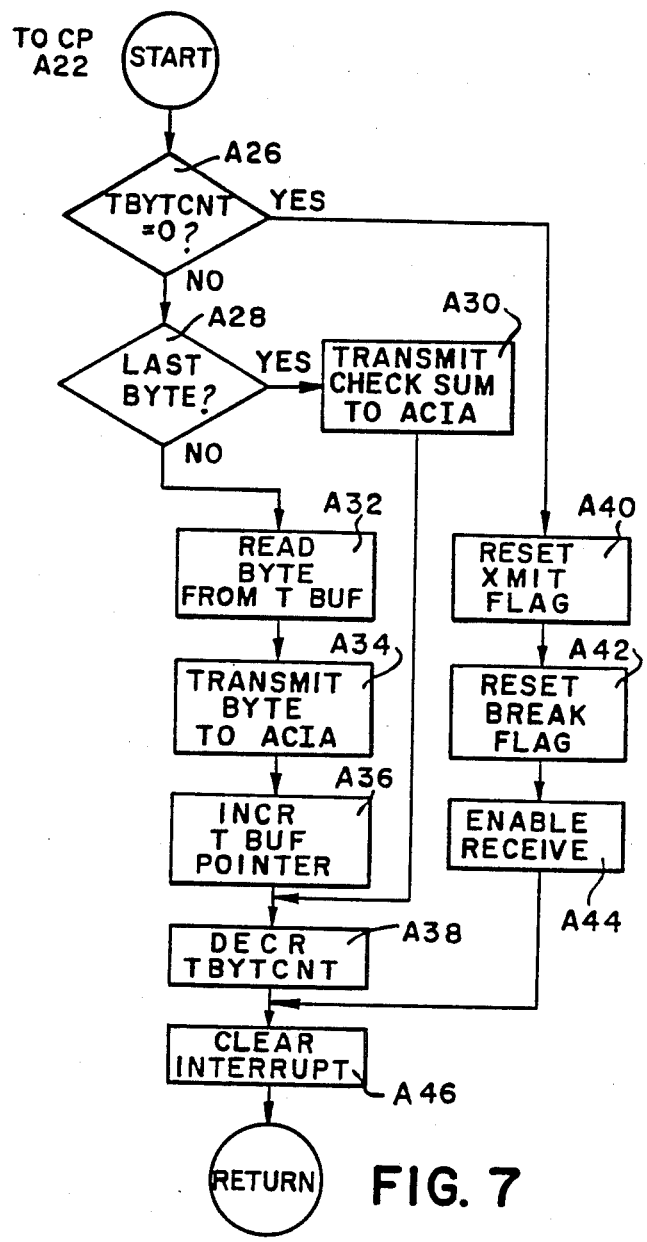
FIG. 7 is a detailed flowchart of the subroutine TOCP used, to transmit information according to the SMPTE protocol used by the system illustrated in FIG. 2.
Figure 8:
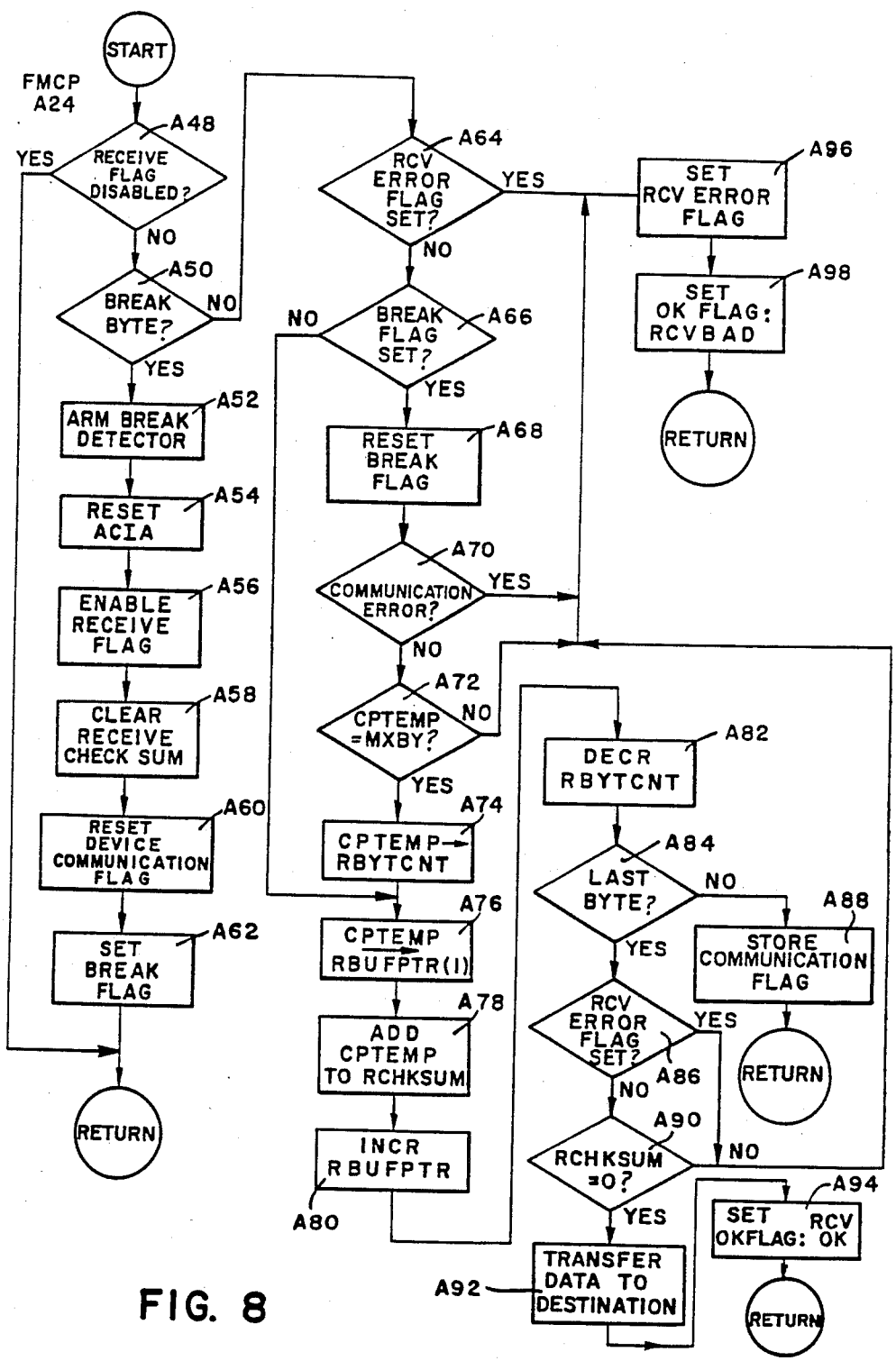
FIG. 8 is a detailed flowchart of the subroutine FMCP which is used to receive information according to the SMPTE protocol used by the system illustrated in FIG. 2.

FIGS. 6, 7, and 8 illustrate software flow charts of the operational functions of the program contained within a ROM memory of the microprocessor 10 to control the flow of serialized data through the data channel 14. Normally, this programming is part of a larger program and will be discussed in that context. However, only the communication routine will be described in detail to show the invention. In FIG. 6 it is illustrated that an initialization routine in block A10 is used to send control data from the microprocessor 10 to the ACIA 12 which indicates the data format that is desired from that device. This data format can include the number of bits in a word, odd or even parity, number of stop bits and baud rate as determined by the communication clock generator 20. After the initialization, the program generally starts one or more main program loops (not shown) which includes the operations accomplished by the microprocessor 10 when in an idle communication state for this channel.

The communication routine in FIG. 6 is entered through a conventional interrupt handling routine A12 when the ACIA 12 interrupts the microprocessor 10. The interrupt handling routine sorts through other communication port and peripheral device interrupts to service the communication data channel 14 and ACIA device 12. Assuming the program has no higher priority devices requesting service and the interrupt is enabled, program control is transferred to the communication routine.

When the communication routine is entered, the program begins by reading the status byte and one byte of data from the receive register of the ACIA 12 in block A14. The data byte from the ACIA 12 which is read is stored in a temporary location labeled CPTEMP of the microprocessor memory in block A16. Thereafter, the microprocessor 10 reads a communication flag in block A18 which is stored in memory to indicate the status of the communication data channel and other operational flags.

The communication flag indicates whether the communication system is in a transmit or receive mode and transfers control from decisional block A20 to either block A22 or block A24 based on this decision. If the communication flag status indicates the system is in a transmit mode, then control is transferred to block A22 where a transmit subroutine TOCP is called, and conversely, if the program determines the system is in a receive mode, then control is transferred to block A24 where a receive routine FMCP is called.

FIG. 7 illustrates the system flow chart of the transmit routine TOCP. Data to be transmitted through serial data channel 14 is stored in a transmit data buffer in RAM memory of microprocessor 10 in the same format as that shown in FIG. 3. Prior to beginning the sending of a data block, a break character is generated by the microprocessor 10 and the ACIA 12 commanded to transmit the specialized character. The character is generated by instructions commanding the ACIA 12 to generate a series of spaces or marks of a specified length. The transmit subroutine TOCP will then be entered to generate the rest of the data block. In decisional block A26 it is first determined whether the transmit byte count TBYTCNT is zero. If the transmit byte count is zero, this is an indication that all bytes in the data block have been sent and the routine should exit the transmit mode. Therefore, in blocks A40–A46, an exit path is taken to first reset a transmit flag in the communication flag word, reset a break flag in the communication flag word, and enable the receive mode of operation. Resetting the break flag enables the system to begin its detection of the start of the break character. Thereafter, the program in block A46 will clear or enable the interrupt to allow a received message to be handled.

However, if a data block has not been entirely transmitted, then a negative branch from the decision in block A26 transfers control to decisional block A28. In that block it is determined whether or not the routine is transmitting the last byte of the data block. If the test is affirmative, control is transferred to block A30 where a check sum for the block which is stored in the transmit data buffer, is sent to the ACIA 12. If the last byte has not been sent, then the program takes a path to block A32 where the data to be sent is read from the transmit buffer. That data byte is then transmitted to the ACIA 12 in block A34. Thereafter, the transmit data buffer pointer TBUF is incremented in block A36 and the transmit byte count TBYTCNT is decremented in block A38. After resetting the memory pointers, the interrupt is cleared in block A46 to prepare the device for receiving data or transmitting another byte from the transmit data buffer during its next cycle.

FIG. 8 is a detailed flowchart of the receive routine FMCP which is entered through the interrupt handling routine and communication routine when the ACIA 12 signals the microprocessor 10 that a full word has been assembled in the receive register and needs to be transmitted to a receive data buffer of the microprocessor. The receive data buffer is of the same format as FIG. 3 and like the transmit buffer, includes word spaces for byte count data and a check sum. After the receive routine is entered by transferring control from the interrupt handling routine and through the main communication routine, the system immediately checks to see if the receive flag in the communication flag word is reset in block A48. If the receive flag is disabled, the program exits and will not accept data from the ACIA 12.

If the receive flag is enabled, the program progresses to block A50 where a test is made to determine if the received data byte is part of the break character. The first break byte is indicated by the first framing error found after the break flag has been reset and a data word has been generated with all zeros. If this is the initial break byte, the start of the break character has been detected. The end of break detector is then armed by resetting the bistable 30 in block A52. Since the reset line of the bistable 30 is in the memory map of the microprocessor 10, addressing the memory location allotted to the reset line will operate the device. After the bistable 30 has been armed in block A52, the microprocessor resets the ACIA 12 to reset the framing error counter and to prepare for the reception of a new data word when the receive clock finally is reenabled. The program thereafter, in block A56, enables the receive flag and clears the space allocated to the receive check sum in the receive data buffer.

The program continues by resetting the communication flags in the communication flag word in block A60 and thereafter, sets the break flag in block A62. The setting of the break flag alerts the program that this is the first framing error detected and the system is now alerted to watch for the termination of the break character. The program then returns until the next interrupt causes a transfer of control to the beginning of the start of the receive program FMCP. The program progresses through blocks A48 and A50 but because the next byte received is not a break byte, the program will continue to block A64 where it checks for a receive error flag in the communication flag word. If the receive error flag is set, this is an indication that either one of the former bytes or the present byte is in error and the program exits immediately. The program exits upon a receive error by setting the receive error flag in the communication flag word in block A96 and then by setting a system ok flag in block A98 to a value RCVBAD indicating the received data is in error.

Assuming the error flag is not set in block A64, the program continues in block A66 to test whether the break flag is set. If the break flag is not set, this means that the program is somewhere in the middle of reading the data and can continue to block A76. However, if the break flag is set, then this is an indication that the system has received the first word of the data block, i.e., the byte count. Thus, the program must store the byte count and prepare for receiving the rest of the data block. The program accomplishes this by first resetting the break flag in block A68, and then by checking for a communication error in block A70. If a communication error is found, then the program is transferred to the exit path comprising blocks A96 and A98, as described previously.

However, if there is no communication error, then in block A72 the data received which was stored in the memory location labeled CPTEMP is tested against a constant to determine if the byte count is correct. If the count is correct, the program progresses to block A74 where the byte count number is placed in storage labelled RBYTCNT. The two paths of the program now come together in block A76 where the value in CPTEMP is loaded into the receive buffer location addressed by the pointer RBUFPTR. The value of CPTEMP is then added to the receive check sum in block A78 and the receive buffer pointer incremented in block A80. Thereafter, the receive byte count RBYTCNT is decremented in block A82 and a test used to determine whether this is the last byte in the data block. If it is the last byte, the program exits by storing the communication flag in block A88 before returning to the main routine.

If the last byte has not been received, the program takes an alternate path to block A86 where the receive error flag is tested. If the receive error flag is set, then the program exits through the error path consisting of blocks A96 and A98 as previously described. Next the receive check sum is tested to determine if it is zero. Because the last byte of any data block is a check sum, adding all the data block bytes together should generate zero as a result. If this is not the case, then the data has not been received correctly and again the error is noted by an exit path through blocks A96 and A98 before the program returns.

However, if the data is found not to have any errors, the receive data buffer is transferred to its ultimate destination in block A92. The ultimate destination can be for use in one of the routines in the main program of the microprocessor 10 or for use by another data channel and program. Block A92 represents the transfer of the data to either a buffer holding data for retransmission or for use by some other program of the microprocessor 10. Thereafter, the system flag for communication has a bit set in it that indicates that the receive data is ok in block A94 before the program exits.

While a preferred embodiment of the invention has been illustrated, it will be obvious to those skilled in the art that various modifications and changes may be made thereto without departing from the spirit and scope of the invention as defined in the appended claims.

What is claimed is:

1. A serial data communication system having an asynchronous communication device clocked by a receive clock signal for receiving a serial data communication consisting of serial data bits and for forming them into digital words of a predetermined number of bits, wherein said serial data communication begins with a break character consisting of a greater number of serial bits than said predetermined number for the digital words, the communication device including a framing error detector which generates a framing error signal whenever a start bit of a digital word is not followed by a stop bit during an interval of time corresponding to the receipt of a digital word, and having a microprocessor for receiving the digital words and status information comprising the error signal from the communication device and for providing control information to the communication device, said data communication system comprising:

means for detecting the presence of the break character in said serial data communication;

means, responsive to the detection of the presence of the break character, for disabling the application of the receive clock signal to said communication device;

means for detecting the termination of the break character in said serial data communication; and means, responsive to the detection of the termination of the break character, for enabling the application of the receive clock signal to said communication device.

2. A serial data communication system as defined in claim 1 wherein said means for detecting the presence of said break character includes:

means, associated with said microprocessor, for interrogating said communication device and for determining its status and the value of data received from said communication device, and means for generating a break signal based on said status and the value of said received data.

3. A serial data communication system as defined in claim 2 wherein:

said break signal generating means generates said break signal in response to a framing error signal status of the communication device and a received data value for a digital bit of zero.

4. A serial data communication system as defined in claim 1 wherein said communication device has a receive clock terminal for accepting said receive clock and said means for disabling the receive clock include:

a logic gate disposed between the receive clock signal and said receive clock terminal of said communication device, said logic gate having at least one input for enabling or disabling the passage of said receive clock signal through said logic gate; and means for disabling said at least one input of said logic gate in response to the detection of the break character.

5. A serial data communication system as defined in claim 4 wherein said means for enabling said receive clock include:

means for enabling said at least one input of said logic gate in response to said termination of break detection.

6. A serial data communication system as defined in claim 1 wherein said communication device has a receive clock terminal for accepting said receive clock and said means for disabling and for enabling the receive clock include:

a logic gate disposed between the receive clock and said receive clock terminal of said communication device, said logic gate having at least one input for enabling or disabling the passage of said receive clock signal through said logic gate; and bistable means generating an output logic signal which is one of two states depending upon the state of at least one control logic signal input to the device, said output logic signal being applied to said at least one input of said logic gate to enable said receive clock with one state and to disable said receive clock with the other.

7. A serial data communication system as defined in claim 6 wherein:
said bistable means comprises a D-type bistable device which has a reset terminal R connected to a select line of an address decoder of said microprocessor, has a clock input terminal CLK connected to an input receive data line, and has a Q output connected to said at least one input of said logic gate.

8. A serial data communication system as defined in claim 7 wherein:
said detection of the presence of the break character causes said microprocessor to address said select line and reset said bistable device thereby disabling said receive clock.

9. A serial data communication system as defined in claim 8 wherein:
said logic gate is a dual-input NAND gate with its output terminal connected to receive said receive clock terminal, one of its inputs connected to said receive clock signal, and the other of its inputs connected to the Q output of said bistable device.

10. A method for serial data communication by a tributary including a microprocessor and an asynchronous communication interface adapter (ACIA) connected to a communication channel, said ACIA including a framing error detector which generates a framing error signal in response to a data word with a start bit and a stop bit separated by a time interval in excess of a predetermined interval, said method comprising:
transmitting a break character to alert devices of a subsequently transmitted data block;
transmitting a data block including a plurality of data words, a count word indicating the number of data words transmitted, and a check sum word of the data and count words;
determining whether said tributary is in an idle or active data receiving state;
interrogating said ACIA upon the receipt of a word for its status;
detecting the transmission of said break character as a framing error signal during an idle state;
detecting the termination of said break character;
transferring said tributary from an idle state to an active receiving state in response to detection of the termination of said break character; and
receiving said data block.

11. A method as defined in claim 10 wherein said step of detecting the termination of said break character includes the step of:
detecting the next logic level transition in said serial data communication.

12. A method as defined in claim 11 which further includes the step of:
resetting said framing error detector of said ACIA to detect a start bit of the first data word following the termination of said break character.

13. A method as defined in claim 12 wherein said step of resetting said framing error detector includes:
inhibiting the reception of data between the detection of the transmission of said break character and the detection of the termination of said break character.

14. A method as defined in claim 13 wherein received data is input to the ACIA in a time relationship with a receive clock signal and wherein said step of inhibiting the reception of data includes the step of:
disabling the application of the receive clock signal to said ACIA between the detection of the transmission of said break character and the termination of said break character.

15. A microprocessor controlled communication system comprising:
a programmed microprocessor means for transmitting data and control words to a communication channel interface, and for receiving data and status words from said interface;
said interface including means for receiving serial data from said communication channel and forming it into received data words and for disassembling transmitted words and transmitting serial data to said communication channel;
communication clock means for generating a clock waveform, said interface receiving said clock waveform and timing said serial data communication; and
means, responsive to said microprocessor means and to the logic level of the data and status words received over said communication channel, for enabling and disabling the application of said clock waveform to said interface.

16. A microprocessor controlled communication system as defined in claim 15 wherein said enabling and disabling means include:
a logic gate disposed between said communication clock means and said interface, said logic gate having at least one input for enabling or disabling the passage of said clock waveform through said logic gate; and
bistable means generating an output logic signal which is one of two states in response to said microprocessor means and the state of said received data, said output logic signal being applied to said at least one input of said logic gate to enable said clock waveform with one state and to disable said clock waveform with the other.

17. A method for receiving a binary serial data stream including a break character followed by a plurality of data words, the break character beginning with a number of bits of one state which number is greater than the number of bits in a data word and ending with at least one bit of the other state, the data words comprising a predetermined number of bits beginning with a start bit of said one state and ending with a stop bit of said other state; said method comprising the steps of:
(a) first sampling said serial data stream until said one state is detected;
(b) second sampling said serial data stream said predetermined number of bits later to determine the state of the data stream;
(c) determining whether the break character has previously occurred in the data stream and, thereafter;
(d) accepting received bits between said first sampling and second sampling as a data word if said break character has previously occurred; and
(e) identifying received bits between said first sampling and second sampling as the presence of the break character if said break character has not previously occurred and said second sampling indicates the state of the data stream is said one state.

18. A method for receiving a binary serial data stream as set forth in claim 17 further including the steps of:
indicating a data word has no framing error if said second sampling indicates the state of the data stream is said other state; or indicating a data word has a framing error if said second sampling indicates the state of the data stream is said one state.

19. A method for receiving a binary serial data stream as set forth in claim 17 which further includes the step of:

(f) ignoring subsequent received bits until the state of said data stream changes to said other state.

20. A method for receiving a binary serial data stream as set forth in claim 19 wherein said step of accepting a data word includes:

decoding the first accepted data word after the break character to determine the number of data words in said stream;

accepting the decoded number of data words from the data stream; and resetting the break character determination so that it indicates that a break character has not previously occurred.

21. In a serial data communication system in which information is transmitted over a serial transmission path in words each having a predetermined number of bits and identified by stop and start bits, and in which a break character having a different number of bits and identified by said stop and start bits is also transmitted via said serial transmission path, apparatus for reducing errors in the detection of the first word following a break character, comprising:

means for receiving a bit stream transmitted over said path and detecting a start bit;

means for determining whether a stop bit is present at said predetermined number of bits subsequent to the detected start bit in the received bits, and indicating an error condition if a stop bit is determined not to be present; and means responsive to the bits in the bit stream and to said error condition indication for inhibiting said receiving means from receiving said bit stream upon indication of an error condition until a stop bit is detected in the bit stream.

22. The apparatus of claim 21 wherein said receiving means detects bits transmitted on said path in response to clock pulses, and said inhibiting means interrupts said clock pulses upon generation of said error condition indication.

23. The apparatus of claim 22 wherein said inhibiting means comprises a logic circuit that is responsive to said indication to interrupt the application of said clock pulses to said receiving means an responsive to a stop bit transmitted over said path to resume the application of said clock pulses to said receiving means.

24. The apparatus of claim 23 wherein said logic circuit includes D-type flip-flop that is reset by said indication to generate an inhibit signal and that as triggered by a stop bit transmitted over said path to generate an enable signal, and a gate that is responsive to said inhibit and enable signals to selectively transmit said clock pulses to said receiving means.

25. In a serial data communication system of the type in which information is transmitted over a serial communication path in words of a standard length, apparatus for inhibiting a no standard length character transmitted over said path from interfering with the reliable detection of said standard length words, comprising:

means for receiving digital data transmitted over said path and determining whether a received word has the standard length;

means for providing an indication that a received character is of a non-standard length; and means responsive to said indication for interrupting the reception of digital data by said receiving means and for detecting the end of said nonstandard length character to enable said receiving means to resume reception of digital data transmitted over said path upon such detection.

26. The apparatus of claim 25 wherein said receiving means includes a microprocessor and an associated serial interface circuit.

27. The apparatus of claim 25 wherein said receiving means detects digital data on said path in response to clock pulses, and said interrupting means inhibits said clock pulses upon generation of said indication.

28. The apparatus of claim 27 wherein said interrupting means comprises a logic circuit that is responsive to said indication to inhibit the application of said clock pulses to said receiving means and responsive to the content of digital data transmitted over said path to resume the application of said clock pulses to said receiving means.

29. The apparatus of claim 28 wherein said logic circuit includes a D-type flip-flop that is reset by said indication to generate an inhibit signal and that is triggered by predetermined digital data transmitted over said path to generate an enable signal, and a gate that is responsive to said inhibit and enable signals to selectively transmit said clock pulses to said receiving means.

30. The system of claim 25 wherein transmission of a character of nonstandard length over said path denotes the start of a block of words of said standard length.

31. In a serial data communication system of the type in which data is sent in blocks containing words of standard length and each block of data is preceded by a break word of nonstandard length, a method for reducing the likelihood that transmission of the break word will interfere with the detection of valid data, comprising:

detecting digital words transmitted over a serial communication path;

determining whether each word is of the standard length and indicating a framing error when a detected word does not have the standard length;

determining whether a block of data is currently being received when the framing error is indicated;

identifying the received word as the break word if a framing error is indicated and a block of data is not currently being received; and inhibiting the further reception of bits in the break word.

32. The method of claim 31 further including the steps of:

detecting the termination of the break word, and resuming the reception of data upon detecting the termination of the break word.

33. The method of claim 31, wherein the step of determining whether a block of data is currently being received comprises the steps of storing the number of words in a block of data, counting each word of a block as it is received, and determining whether the counted number of words is less than said stored number.

* * * * *